July 26, 1960  B. C. ELLIS, JR  2,946,527
SNAGGING DEVICE
Filed April 2, 1958  3 Sheets-Sheet 1

INVENTOR.
B. C. ELLIS, JR.
BY A.C. Schwarz, Jr.
ATTORNEY

July 26, 1960
B. C. ELLIS, JR
2,946,527
SNAGGING DEVICE

Filed April 2, 1958
3 Sheets-Sheet 2

INVENTOR.
B. C. ELLIS, JR.
BY A.C. Schwarz, Jr.
ATTORNEY

July 26, 1960  B. C. ELLIS, JR  2,946,527
SNAGGING DEVICE

Filed April 2, 1958  3 Sheets-Sheet 3

INVENTOR.
B. C. ELLIS, JR.
BY a.C. Schwarz, Jr.
ATTORNEY

United States Patent Office 2,946,527
Patented July 26, 1960

2,946,527

SNAGGING DEVICE

Benjamin C. Ellis, Jr., Baltimore, Md., assignor to Western Electric Company, Incorporated, New York, N.Y., a corporation of New York Filed Apr. 2, 1958, Ser. No. 725,943

5 Claims. (Cl. 242—25)

The present invention relates to improved snagging devices, and more particularly, although not exclusively, to improved snagging devices for securing a portion of a strand or filamentary material to one or more rotatable take-up reels of take-up apparatus which continues to operate uninterruptedly as the distribution of the strand or filamentary material is transferred from one take-up reel to a succeeding take-up reel.

In general, insulated electrical coductors are manufactured by means of a substantially continuous process in which an elongated conductive core or conductor is advanced continuously from a supply thereof to and through a series of manufacturing apparatus or processes, such as continuous extrusion apparatus, to produce the finished insulated conductor.

In the operation of continuous extrusion apparatus to manufacture covered cores, a conductor of indefinite length, which may comprise one or more individual strands of material, is advanced continuously from a suitable source of supply through the extrusion apparatus which forms a covering of insulating material around the conductor.

Since the stoppage of the extrusion apparatus slows down production, may cause damage to the conductor and causes waste by producing over-sized or nonuniform coverings of insulating material, it is desirable to operate the extrusion apparatus continuously so that interruption of the advancement of the core through the extrusion apparatus does not occur. In order that the extrusion operation may continue without interruption or disturbance, it is common practice to employ take-up apparatus having two or more rotatable take-up reels onto which predetermined lengths of finished insulated conductors are wound successively. In this way, when a predetermined length of insulated conductor has been wound upon one take-up reel, the insulated conductor is transferred to an empty take-up reel without interrupting the advancement of the insulated conductor emerging from the extrusion apparatus.

In take-up apparatus of the type which may be utilized for taking up an advancing insulated conductor continuously upon rotatably driven take-up reels, it is common practice to employ distributing means mounted for movement transversely of the winding surface of the take-up reels and means for indexing the distributing means from one take-up reel, onto which a desired amount of insulated conductor has been distributed to form uniform layers of convolutions of the insulated conductor thereon, to another take-up reel onto which the strand is distributed similarly.

In take-up apparatus of this type, means are connected operatively to adjacent sides of each of the take-up reels for gripping portions of the insulated conductor extending between the reels when the distribution of the insulated conductor is transferred from one reel to another. The trailing end of the insulated conductor is secured to the reel filled with the desired amount, and the leading end of the insulated conductor to be reeled on the empty reel is secured thereto. The portion of the insulated conductor extending between the reels is cut by a conventional knife positioned across the path formed by the extending portion of the insulated conductor as the reels continue to rotate during the transfer of the distribution of the insulated conductor.

A common type of such means for gripping portions of the insulated conductor is a rotatable snagging disc which is connected operatively to each of the take-up reels and has a plurality of integral snagging teeth formed on the outer periphery thereof. The snagging teeth each have a free end which projects in the direction of rotation of the associated take-up reels and is positioned adjacent to the outer periphery of the snagging disc to form an elongated slot, between the snagging teeth and the surface of an adjacent portion of the snagging disc. Portions of the insulated conductor are caught and wedged in a slot on each snagging disc as a result of the rotation of the snagging discs when the portions of the insulated conductor are moved in contact therewith during the transfer of the distribution of the insulated conductor.

As a result of the increasingly high speeds of operation of present day manufacturing apparatus, some difficulties have been encountered in attempting to effect successful cutovers or transfers while utilizing the above-described snagging discs. It is desirable to have improved snagging devices which will assure effective transfers of the distribution or effective cutover operations at high speeds so that, when the insulated conductor is moved across the periphery of the snagging discs during a transfer of the insulated conductor from the full take-up reel to the empty take-up reel, the first snagging finger on each of the rotating snagging discs to arrive at the position of the insulated conductor will catch a portion of the insulated conductor and they will cooperate with each other to carry the portion of the insulated conductor extending therebetween against the cutting knife.

It is desirable to have snagging devices which will insure that when the strand is severed by the knife the new leading end thereof will remain attached between one of the snagging fingers and the snagging disc associated with the empty reel and will start to wind on the winding drum of the empty reel so that reeling of the insulated conductor commences on the winding drum of the empty take-up reel without interruption.

An object of the present invention is the improvement of snagging devices utilized on take-up or strand reeling apparatus.

Another object of the present invention is to provide improved snagging devices for strand take-up apparatus which will permit continuous reeling of a strand being delivered to the take-up apparatus from a previous manufacturing process and permit transfer of distribution of the strand being wound upon a take-up reel, about to become filled, to an empty take-up reel without stopping the take-up apparatus or interrupting the advancement of the strand through the previous manufacturing process.

A further object of the present invention is to provide a snagging device for take-up apparatus whereby the take-up apparatus can be operated with greater speed and better efficiency.

Other and more specific objects of the invention include the improvements in construction and cooperative relationship of component parts which go into making up an improved snagging device.

In attaining these and other objects, take-up apparatus embodying certain features of the present invention may comprise a plurality of rotatably driven take-up reels, a strand distributing means mounted for movement transversely of the winding surface of the take-up reels, and means for indexing the strand distributing means from an operating station wherein the strand is distributed on one of the take-up reels to another operating station wherein the strand is distributed similarly upon a succeeding take-up reel. A rotatable snagging disc may be connected operatively to each of the reels and have a plurality of snagging teeth having free ends projecting in the direction of rotation of the take-up reel and positioned adjacent to the outer periphery of the snagging disc. An elongated slot is formed between each of the snagging teeth and the surface of an adjacent portion of the snagging disc into which a portion of the strand, which is caused to contact the outer periphery of the snagging disc during a cutover operation, is caught. The strand will be forced inwardly of the slot as a result of the rotation of the snagging disc for gripping portions of the strand adjacent to each reel when the distribution of the strand is indexed from one reel to a succeeding reel.

The above snagging disc may be modified by placing an elongated piece of resilient material adjacent to at least one side of and diagonally across each of the slots formed by the snagging teeth and the adjacent portions of the snagging disc. In this way, when the strand is caught by the snagging tooth and is forced inwardly of the elongated slot toward the inner end thereof, each portion of the strand projecting from the slot on the side on which the elongated piece of resilient material is positioned will ride between the elongated piece of resilient material and the portion of the snagging device adjacent to the trailing end of the elongated piece of resilient material and will be bent in an angular configuration with respect to the adjacent portion of the strand positioned in the slot.

Other objects and features of the invention will be more readily understood from the following detailed description when read in conjunction with the accompanying drawings, in which.

Figure 1:
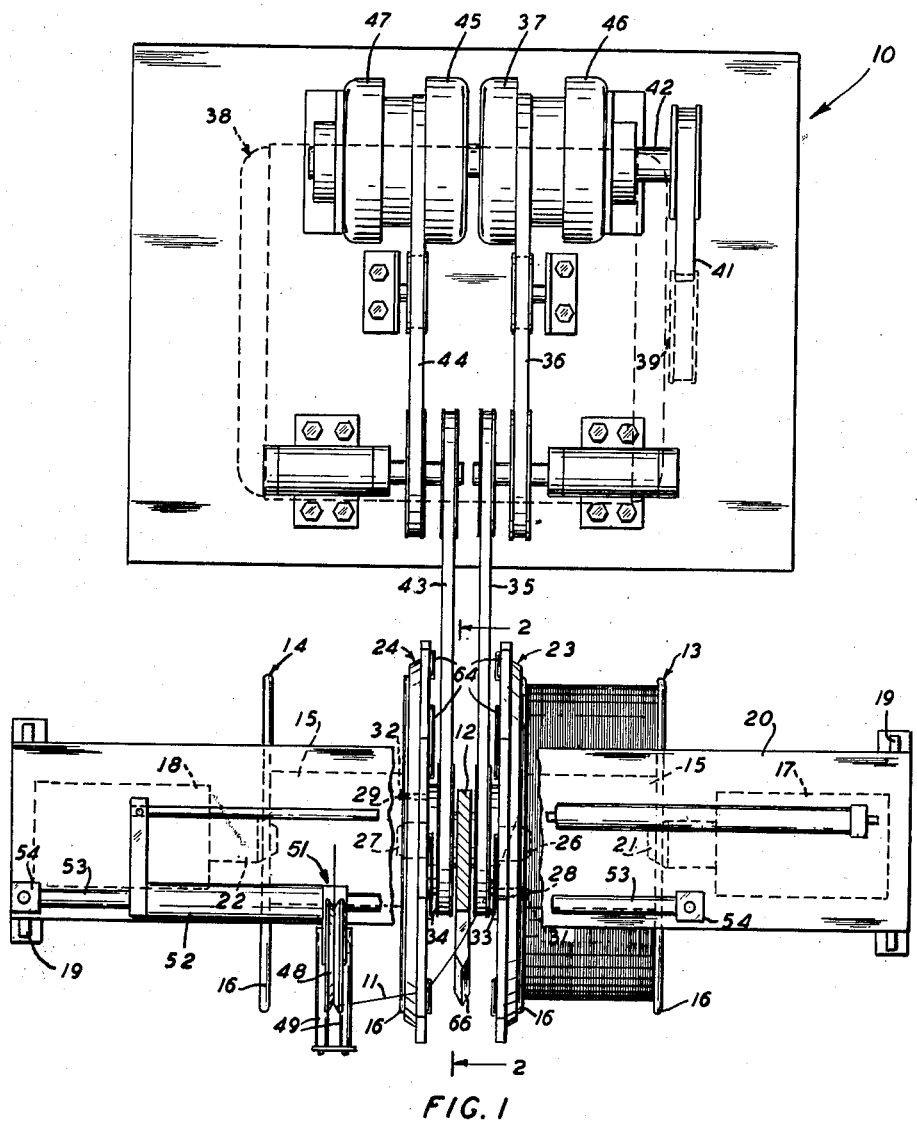
Fig. 1 is a fragmentary, top plan view of a portion of a take-up apparatus embodying a preferred embodiment of the invention.
Figure 2:
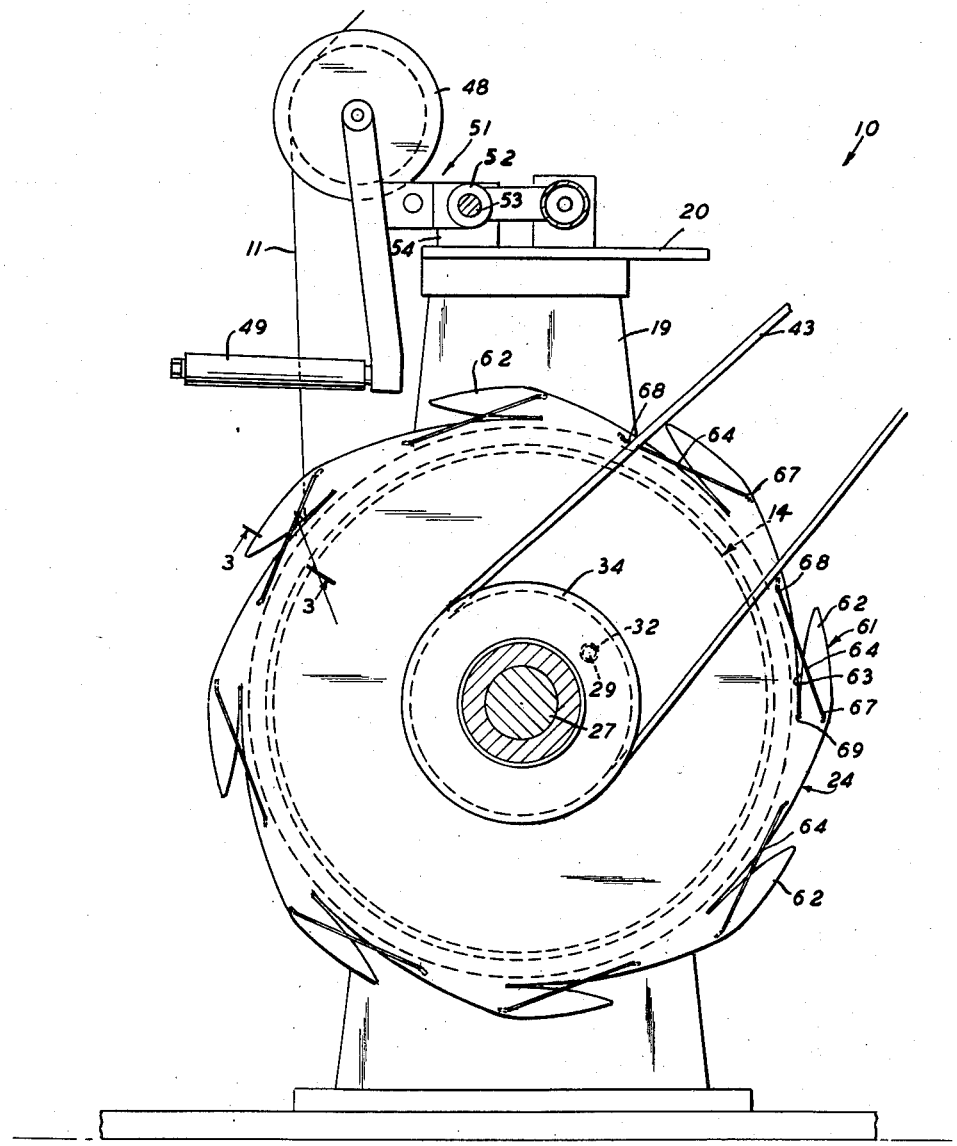
Fig. 2 is a fragmentary, enlarged, sectional view of a portion of the take-up apparatus illustrated in Fig. 1 taken along line 2—2 thereof.

Referring now to the drawings, and more particularly to Figs. 1 and 2 thereof, there is shown a take-up apparatus, designated generally by the numeral 10, for reeling a strand 11 without interruption, which comprises a thin rigid support member 12 located centrally between a right take-up reel, designated generally by the numeral 13, and a left take-up reel, designated generally by the numeral 14, which reels 13 and 14 are positioned side by side and are aligned axially but could be positioned otherwise.

The take-up reels 13 and 14 are identical in construction and of a conventional design, each of which includes a cylindrical winding drum 15 and a pair of flange-like reel heads 16—16 secured fixedly at opposite ends of the winding drum 15.

The reels 13 and 14 are urged toward the support member 12 by hydraulic piston-cylinder assemblies 17 and 18, which are secured to rigid support members 19—19 of an inverted U-shaped frame 20 on opposite sides thereof, through the pins or live centers 21 and 22 of tail stocks which help to support the reels 13 and 14, respectively. The reels 13 and 14, which are actuated by the piston-cylinder assemblies 17 and 18, are urged against snagging discs, designated generally by the numerals 23 and 24, respectively, secured rotatably to the rigid support member 12.

The reels 13 and 14 are secured to the associated snagging discs 23 and 24, respectively, for rotation therewith by means of axial projections or live centers 26 and 27 of head stocks and eccentrically mounted dog projections 28 and 29. The axial projections or supporting centers 26 and 27 of the head stocks are utilized to cooperate with the pins or centers 21 and 22 of the tail stocks to support the opposing ends of the reels 13 and 14, respectively, and the eccentrically positioned projections 28 and 29 project into eccentrically positioned apertures 31 and 32 in the flange-like heads 16—16 of the reels 13 and 14 and are used for transmitting torque to the reels 13 and 14 from the snagger discs 23 and 24, respectively.

The reel supporting centers 26 and 27 are connected operatively to pulleys 33 and 34, respectively, for rotation therewith. The pulley 33 is connected by means of endless belts 35 and 36 to a magnetic clutch 37 which is driven rotatably by an electric drive motor, designated generally by the numeral 38, through an output shaft 39, an endless belt 41, and a shaft 42. Similarly, the pulley 34 is connected by means of endless belts 43 and 44 to a magnetic clutch 45 driven by the electric drive motor 38 through the output shaft 39, the endless belt 41 and the shaft 42.

Magnetic brakes 46 and 47 are connected operatively to each of the drive means associated with the right reel 13 and the left reel 14, respectively. The brakes 46 and 47 are utilized to stop the motion of a full reel of strand 11 and to create slack in the strand 11 which will permit the cutover from one reel to the other reel to take place without placing excessive stresses in the strand 11.

The strand 11, which may be, for example, an insulated conductor delivered at a substantially constant rate from a continuous extrusion apparatus (not shown) by a conventional strand-advancing capstan (not shown) and through a conventional strand accumulator (not shown), passes to and partially around a rotatable guide sheave 48 and between a pair of spaced parallel guide fingers 49—49 which are secured to a conventional distributing carriage, designated generally by the numeral 51. The sheave 48 and the guide fingers 49—49 are moved transversely of either of the take-up reels 13 and 14 by the distributing carriage 51 to distribute the processed strand 11 evenly across the winding surface thereof and to guide the strand 11 as the distributor carriage 51 is indexed from one take-up reel to the other during a cutover operation.

The distributor carriage 51 may be driven by any of many well-known means and is mounted slidably, by a bearing 52, on a horizontally extending traverse rod 53 for transverse movement therealong. The traverse rod 53 is supported fixedly to the inverted U-shaped frame 20 adjacent to the opposing ends thereof by upright members 54—54.

When one of the reels 13 and 14 is rotated by the motor 38 to take up the processed strand 11, the distributor carriage 51 is moved transversely of the winding surface of the reel 13 or 14 and parallel to the rotational axis thereof so as to move the distributor which, in turn, directs the processed strand 11 evenly back and forth along the winding surface of the reel 13 or 14 onto which the strand 11 is being taken up. The adjustment of the speed and length of travel of the carriage 51 with respect to the rotational speed and length of the take-up reel may be achieved by any of many well-known means.

Suitable electrical and fluid control means (not shown) are provided for stopping, starting and controlling the take-up apparatus including the drive motor 38, the magnetic clutches 37 and 45, the magnetic brakes 46 and 47, and the distributing means 51. The control means are disclosed in detail in my copending application Serial No.

656,956, filed May 3, 1957, as are many of the other features of the take-up apparatus.

A plurality of snagging devices, designated generally by the numeral 61 (see Fig. 2), are formed on the outer periphery of the rotating snagging discs 23 and 24, connected to each of the reels 13 and 14 on adjacent sides thereof, and are formed by a plurality of snagging teeth 62—62 which are integral with and project from the snagging discs 23 and 24. The ends of the snagging teeth 62—62 project in the direction of rotation of the take-up reels 13 and 14 and snagging discs 23 and 24 and cooperate with the surface of the adjacent portions of the snagging discs 23 and 24 to form slots 63—63 into which a portion of the strand 11 is directed to connect the strand 11 to the snagging device 61 and thus the snagging disc and take-up reel associated therewith.

A piece of piano wire or other resilient material 64 is positioned adjacent to and diagonally of the slot 63 and crosses the slot at about the midpoint of the length thereof. The piece of wire 64 is secured at one end of the associated snagging disc 23 or 24, in any appropriate manner, and is secured similarly at the other end to the associated snagging tooth 62 approximately radially outwardly from the inner end of the slot 63 formed between the snagging tooth 62 and the associated snagging disc 23 or 24.

As the strand 11 is caught by a snagging tooth 62 during the cutover operation and is forced inwardly of the slot 63, it will ride under the wire 64 and between the wire 64 and the snagging tooth 62 and will be bent in a substantially L-shaped angular configuration or a 90° angle. The strand 11 will be held in the slot 63 and clamped between the wire 64 and the tooth 62 to secure the strand 11 to the snagging disc 23 or 24 and, in turn, to the take-up reel 13 or 14, associated therewith.

In this way, each of the pieces of wire 64 cooperates with the associated snagging tooth 62 on the associated snagging disc 23 or 24 to form a resilient keeper into which the strand 11 is directed, caught and held during and after the strand 11 is cut by a conventional knife 66, secured to the support member 12 and positioned between the discs 23 and 24 and thus the reels 13 and 14, as a result of the rotation of the reels 13 and 14 during the cut-over operation.

The piece of resilient wire 64 may be replaced by an elongated piece of resilient material of any of many shapes and cross-sectional dimensions. The resilient member 64, if sufficiently stiff, may be secured only on one end, to either the associated snagging tooth 62 or the associated snagging disc 23 or 24 and at the trailing end 67 or leading end 68 as determined while it is being revolved by the associated snagging disc 23 or 24.

The resilient wire or member 64 may be slanted diagonally of the slot 63 in any direction so that the leading end 68 thereof, as the snagging disc is rotated, is positioned adjacent to either the associated snagging disc 23 or 24 or the snagging tooth 62. However, the wire or member 64 must cross the slot 63 at some place ahead of the inner end 69 thereof. The wire 64 must be so constructed and arranged with respect to the associated snagging disc 23 or 24 and the snagging tooth 62 that the portion of the strand 11 projecting from the slot 63 will bend with respect thereto and ride between the elongated piece of resilient material 64 and the snagging member adjacent to the trailing end 67 of the elongated piece of resilient material 64, which may be either the snagging tooth 62 or the associated snagging disc 23 or 24.

Figure 3:
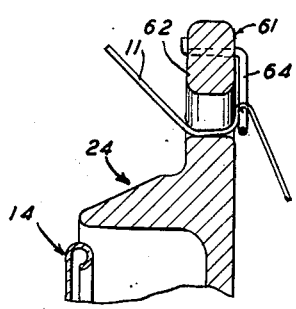
Fig. 3 is a fragmentary, enlarged, sectional view of a snagging device of the take-up apparatus illustrated in Fig. 2 taken along line 3—3 thereof.

Further, even though the pieces of wire 64 may be placed on either side or on both sides of the snagging disc 23 or 24, it has been found preferable to place a single piece of wire 64 on the side of the snagging disc 23 or 24 opposite to that which the take-up reel 13 or 14 contacts or the side of the snagging disc 23 or 24 adjacent to the companion snagger disc 23 or 24 of the companion take-up reel 13 or 14, as illustrated in Figs. 1, 2 and 3.

Figure 4:
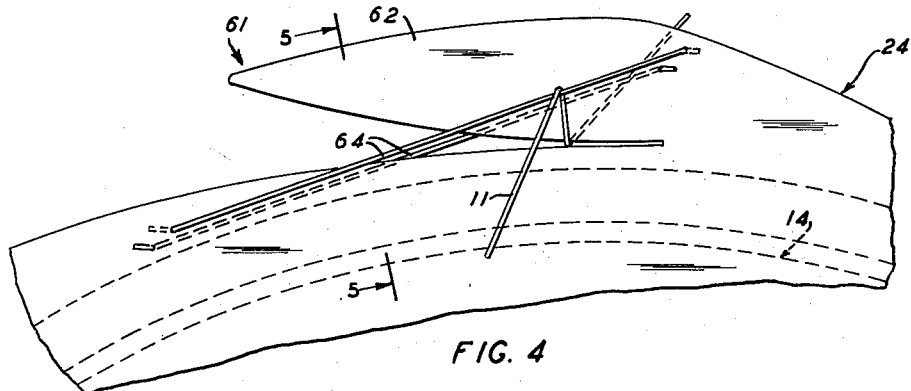
Fig. 4 is a fragmentary view of an alternate embodiment of the snagging device.
Figure 5:
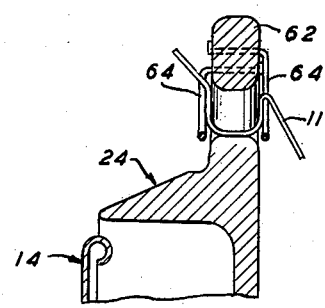
Fig. 5 is a fragmentary, sectional view of the snagging device of Fig. 4 taken along line 5—5 thereof.

It should be noted that if the pieces of wire 64—64 are placed on both sides of the snagging disc 23 or 24, with the trailing ends 67—67 thereof adjacent to the snagging teeth 62, the strand 11 will be forced into a substantially U-shaped configuration, in contact with the sides of the snagging tooth 62 and the face thereof adjacent to the snagging disc 23 or 24, as illustrated in Figs. 4 and 5, and is clamped in that position by the resiliency of the pieces of wire 64—64.

Figure 6:
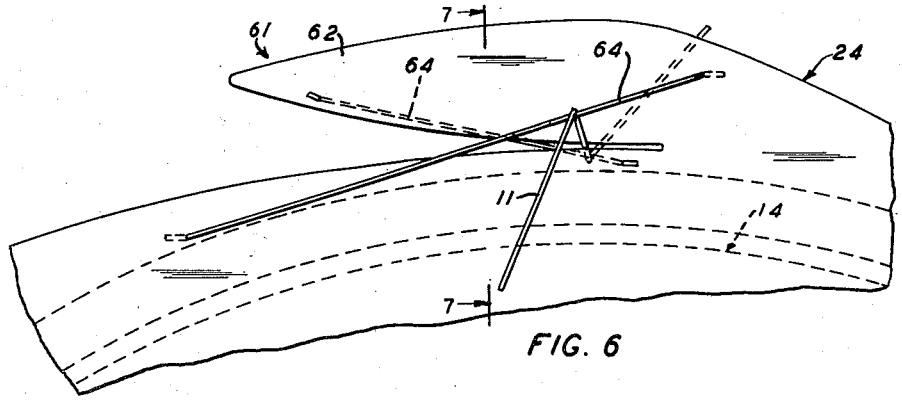
Fig. 6 is a fragmentary view of another alternate embodiment of the snagging device.
Figure 7:
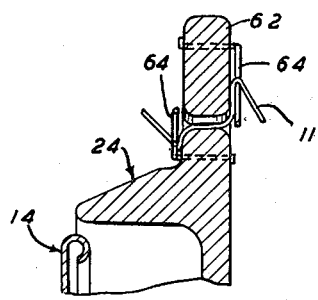
Fig. 7 is a fragmentary view of the snagging device of Fig. 6 taken along line 7—7 thereof.

Also, if the pieces of wire 64—64 are placed on opposite sides of the snagging disc 23 or 24 and are positioned diagonally with respect to each other, the strand 11 projecting on opposite sides of the snagging disc 23 or 24 will be bent in opposite directions and each at approximately 90° with respect to the portion of the strand 11 positioned in the slot 63, as illustrated in Figs. 6 and 7.

As a result of the high speed of rotation of the full reel 13 or 14 with respect to the velocity of the distributor carriage 51 and as a result of the spacing of the snagging teeth 62—62 on the snagging disc 23 or 24, the strand 11 will be caught by the snagging device 61 on the full reel in advance of the relative peripheral position of the snagging device 61 which catches the strand 11 and attaches it to the snagging disc 23 or 24 associated with the empty reel. This will result in the strand 11 extending between the disc 23 and 24 being disposed at an angle with respect to the axis of rotation of the reels 13 and 14. The exact degree of the angle will vary depending on the particular circumstances involved during any one cutover.

*Operation*

Assuming that the right reel 13 is being filled with the insulated strand 11 being supplied from the extrusion apparatus (not shown) the distributor 51 will direct the strand 11 onto the right reel 13, until a certain predetermined length of the strand 11 is wound thereon as determined by an automatic counter system (not shown) or by conventional manually operated controls. Prior to the cutover being commenced by the counter system, the control system causes the clutch 45 associated with the left or empty reel 14 to be actuated at a predetermined time thereby driving the empty reel 14 and the partially filled reel 13 at desired predetermined speeds.

When the right take-up reel 13 onto which the processed strand 11 is being reeled has become completely filled or filled with the desired amount of strand 11, an automatic cutover takes place to cause the distributor 51 to index the distribution of the insulated strand 11 from the full reel 13 to the empty reel 14. The strand 11 is moved in contact with a snagging device 61 on the periphery of the snagging disc 23, and then moved in contact with a snagging device 61 on the periphery of the snagging disc 24.

During the cutover operation a portion of the strand 11 is caught by one snagging tooth 62 on each of the snagging discs 23 and 24 and is forced inwardly of each of the associated slots 63—63. The portion of the strand 11 projecting from each of the slots 63—63 toward the companion snagging disc will ride under the piece of wire 64 positioned adjacent thereto and between the piece of wire 64 and the associated snagging tooth 62 and will be bent in an angular configuration.

The piece of wire 64 and the snagging tooth 62 forming the snagging device 61 associated with the snagging disc 23 will cooperate to clamp the portion of the trailing end of the strand wound on the reel 13 projecting from the slot 63 to the snagging disc 23 and thus to the take-up reel 13. The piece of wire 64 and the snagging tooth 62 forming the snagging device 61 associated with the snagging disc 24 will cooperate to clamp the portion of the leading end of the strand 11 to be wound on the take-up reel 14 projecting from the slot 63 to the snagging disc 24 and thus to the take-up reel 14.

The strand 11 extending between the snagging devices 61—61 associated with the full reel 13 and the empty reel 14 will become severed by the knife 66 as the reels 13 and 14 carry the portion of the strand 11 extending therebetween past the cutting edge of the knife 66. The full reel 13 will then be stopped by the magnetic brake 46 associated therewith.

Now that a cutover operation is completed and the leading end of the strand 11 to be wound on the take-up reel 14 is connected to the snagging device 61 associated with the snagging disc 24, the reeling operation on the left take-up reel 14 proceeds in a normal manner. The trailing end of the strand 11 wound on the full, right take-up reel 13, which was stopped by the brake 46, is removed from the associated snagging device 61. The full reel 13 is then removed from the reel supports 21 and 26 and replaced by an empty take-up reel 13.

The strand reeling or take-up apparatus is now operating so that the left take-up reel 14 is in the process of being filled. As the strand 11 advances continuously, the distributor 51 is reciprocated to distribute the convolutions of strand 11 in uniform layers upon the winding drum 15 or winding surface of the left-take up reel 14.

Prior to the time the left take-up reel 14 has become full, or a desired predetermined amount of strand 11 has been reeled thereon, the magnetic clutch 37 is energized to rotate the empty right take-up reel 13 and the take-up apparatus again is in readiness for a cutover operation to take place. When each of the take-up reels 13 and 14 are running at predetermined speeds and when the left take-up reel 14 has become filled completely or filled with the desired amount of strand 11, an automatic cutover operation takes place.

As the strand 11 is transferred from the full left take-up reel 14 to the empty right take-up reel 13, one of the snagging devices 61—61 on each of the rotating snagging discs 23 and 24 catch a portion of the strand 11 as described above with regard to the cutover from reel 13 to reel 14. The snagging devices 61—61 cooperate to carry the portion of the strand 11, extending therebetween, against the cutting edge of the knife 66, whereby the strand 11 is severed and the new leading end thereof remains attached to the snagging disc 23 and is wound on the winding drum 15 of the empty right take-up reel 13. Thus, the reeling of the strand 11 commences on the winding drum 15 of the empty take-up reel 13 without interruption, and the full take-up reel 14 is stopped by the magnetic brake 47 associated therewith.

Now that the cutover operation is completed, the reeling operation on the right take-up reel 13 proceeds in the normal manner described previously. The trailing end of the strand 11 wound on the filled left take-up reel 14, which was stopped by the brake 47 at the time of cutover, is removed from the associated snagging device 61. The full reel 14 is then removed from the reel supporting centers 22 and 27 and is replaced by the empty reel 14 in preparation for a subsequent cutover operation.

The various steps of the procedure are then repeated to take up strand on succeeding reels.

It is to be unnderstood that the above-described arrangements are simply illustrative of the application of the principles of the invention. Other arrangements may be devised by those skilled in the art which will embody the principles of the invention and fall within the spirit and scope thereof.

What is claimed is:

1. An improved snagging device, which comprises a rotatble snagging disc, a plurality of snagging teeth secured to the outer periphery of the snagging disc, each of said teeth having a free end projecting in the direction of rotation of the snagging disc and cooperating therewith to form an elongated strand receiving slot, and a plurality of elongated pieces of resilient material secured to the snagging device, one of the pieces of resilient material being positioned adjacent to at least one side of and extending diagonally across each of the slots, the portion of each of the elongated pieces of resilient material extending diagonally across the associated slot being positioned at least as close to the associated tooth as the diameter of the strand material being taken up and yieldably obstructing free movement of the strand in a portion of the associated slot, whereby when the strand is caught by one of the snagging teeth and forced inwardly of the elongated slot each portion of the strand projecting from the slot on the side on which one of the elongated pieces of resilient material is positioned rides between the elongated piece of resilient material and the portion of the snagging device adjacent to the trailing end of the piece of resilient material as determined by the rotation of the snagging disc and is bent in an angular configuration with respect to the adjacent portion of the strand positioned in the slot for clamping the strand in the snagging device.

2. An improved snagging device, which comprises a rotatable snagging disc, a plurality of snagging teeth secured to the outer periphery of the snagging disc, each of said teeth having a free end projecting in the direction of rotation of the snagging disc and cooperating therewith to form an elongated strand receiving slot, and two elongated pieces of resilient material secured to the snagging device adjacent to each slot and yieldably obstructing free movement of the strand in a portion of the slot, one of the pieces of resilient material being positioned adjacent to one side of and extending diagonally across the associated slot and the other piece of resilient material being positioned on the opposite side of the associated slot, the two pieces of resilient material positioned adjacent to each slot being diagonal with respect to each other, whereby when the strand is caught by one of the snagging teeth and forced inwardly of the elongated slot each portion of the strand projecting from the slot rides between the elongated piece of resilient material and the portion of the snagging device adjacent to the trailing end of the piece of resilient material as determined by the rotation of the snagging disc and is bent in an angular configuration with respect to the adjacent portion of the strand positioned in the slot for clamping the strand in the snagging device.

3. In a strand take-up apparatus including a rotatable take-up means and a rotatable snagging disc member connected operably to the take-up means, said snagging disc member having at least one snagging tooth member extending from the periphery and in the direction of rotation thereof in such a manner as to form an elongated strand receiving slot between a portion of the tooth member and an adjacent portion of the disc member, the improvement which comprises an elongated spring member positioned adjacent to at least one side of and extending diagonally across the slot and secured to at least one of the snagging members, whereby when the strand is forced toward the inner end of the slot each portion of the strand projecting from the slot on the side on which the elongated spring member is positioned rides between the elongated spring member and the snagging member adjacent to the trailing end of the elongated spring member as determined by the rotation of the snagging disc member, and is bent and clamped against the snagging member adjacent to the trailing end of the elongated spring member.

4. An improved snagging device, which comprises a rotatable snagging disc, at least one snagging tooth secured to the outer periphery of the snagging disc having a free end projecting in the direction of rotation of the snagging disc, positioned adjacent to the outer periphery thereof and cooperating therewith to form an elongated strand receiving slot, and an elongated piece of resilient material positioned adjacent to and diagonally of the slot and crossing the slot at approximately the midpoint of the length thereof, the piece of resilient material being secured at one end to the snagging disc and being connected at the other end to the associated snagging tooth approximately radially outwardly from the inner end of the slot, whereby when the strand is caught by the snagging tooth and forced toward the inner end of the slot the portion of the strand projecting from the slot on the side on which the piece of resilient material is positioned rides between the piece of resilient material and the snagging tooth and is bent in an angular configuration with respect to the adjacent portion of the strand positioned in the slot for clamping the strand to the snagging device.

5. In strand reeling apparatus for taking up an advancing strand upon rotatably driven take-up reels including a plurality of rotatably mounted reels, means for driving the reels rotatably, strand distributing means mounted for movement transversely of the winding surface of the take-up reels, means for indexing the strand distributing means from an operating station wherein the strand is distributed on one of the take-up reels to another operating station wherein the strand is distributed similarly upon a succeeding take-up reel, and a rotatable snagging disc connected operatively to each of the reels and having at least one snagging tooth which has a free end projecting in the direction of rotation of the take-up reel, said tooth being positioned adjacent to the outer periphery of the disc for forming an elongated slot between the snagging tooth and the surface of an adjacent portion of the snagging disc in which slot a portion of a strand may be caught, the improvement which comprises a piece of resilient wire positioned on at least one side of each of the slots formed between the snagging teeth and the adjacent portion of the associated snagging disc and diagonally with respect to the slot with the trailing end of each of the pieces of wire being secured to the associated snagging tooth and the leading end of each of the wires being connected to the associated snagging disc.

References Cited in the file of this patent

UNITED STATES PATENTS

| | | |
|---|---|---|
| 2,550,448 | Brainerd et al. | Apr. 24, 1951 |
| 2,763,442 | Bruestle | Sept. 18, 1956 |